M. HOUDAILLE.
CANTILEVER SPRING.
APPLICATION FILED JUNE 26, 1919.

1,408,300.

Patented Feb. 28, 1922.

Inventor
M. Houdaille,
By H. P. Kerslake
Atty.

M. HOUDAILLE.
CANTILEVER SPRING.
APPLICATION FILED JUNE 26, 1919.
1,408,300.
Patented Feb. 28, 1922.
2 SHEETS—SHEET 2.
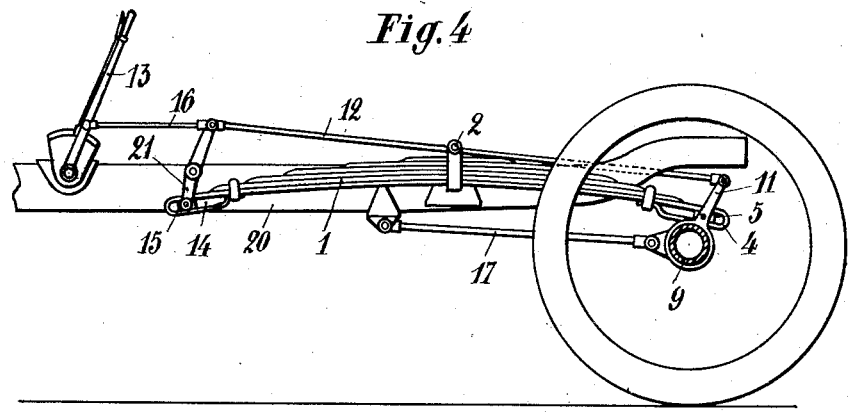
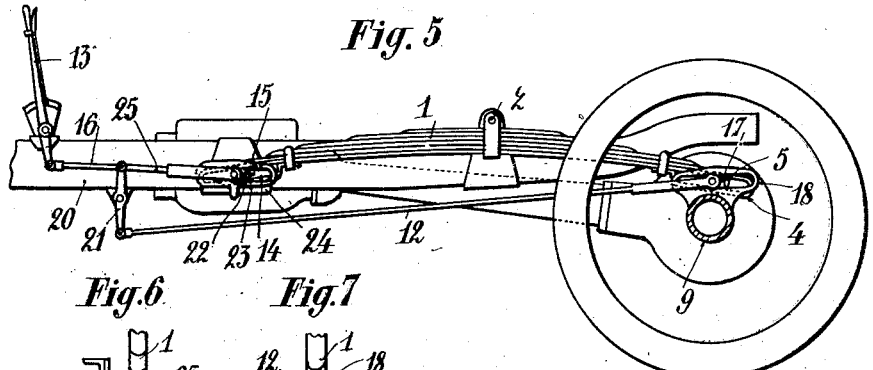
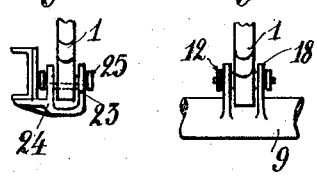 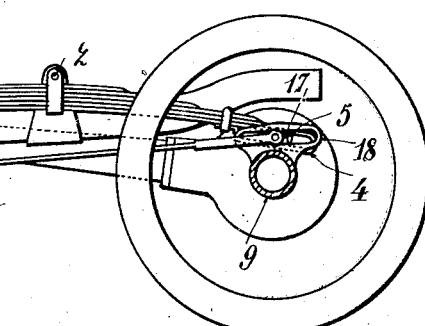
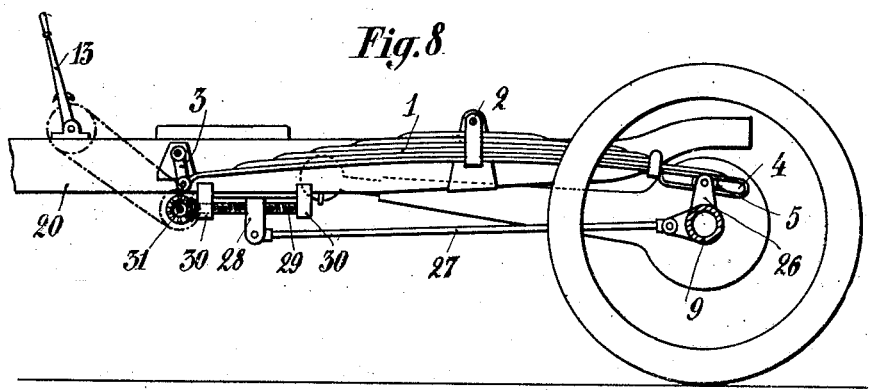
Inventor
M. Houdaille,
By H. R. Kerslake
Atty.

UNITED STATES PATENT OFFICE.

MAURICE HOUDAILLE, OF LEVALLOIS-PERRET, FRANCE.

CANTILEVER SPRING.

1,408,300.   Specification of Letters Patent.   Patented Feb. 28, 1922.

Application filed June 26, 1919.   Serial No. 307,003.

*To all whom it may concern:*

Be it known that I, MAURICE HOUDAILLE, a citizen of the French Republic, residing at 50 Rue Raspail, Levallois-Perret, Seine, France, have invented certain new and useful Improvements in Cantilever Springs, (for which application has been filed in France September 21, 1916,) of which the following is a specification.

This invention relates to improvements in or modification of the construction described in specification of the Patent No. 1,200,194 of 3 October, 1916, which relates to the adjustment or regulation of the flexibility of a leaf spring by moving its points of support so as to modify the length of spring blade between the said points. Thus it is possible to absorb, with the same springs, shocks and vibrations in accordance with one and the same law, whatever be the variations of the load.

The present invention relates to an application of the prior invention to cantilever springs, that is to say, to leaf springs for vehicles in which the axle is suspended so as to overhang at one of the ends of the spring.

Several constructions are illustrated in the various figures of the accompanying drawing.

Referring to the drawings:—

Figures 3, 4 and 5 are side views of modifications.

Figures 6 and 7 are views of details of the construction shown in Figure 5.

Figure 8 is a side view of the further modification.

Figure 1:
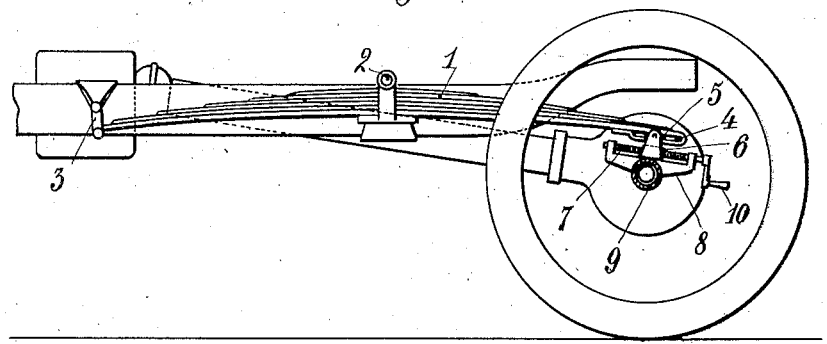
Figure 1 is a side view of one form of the invention in which the rear axle of a vehicle is adjustably connected to the slotted rear end of a cantilever spring. The adjusting means in this case being operated from the rear of the vehicle.

In the construction shown in Figure 1, a cantilever spring 1 has its central shackle pivoted to one of the bars of the frame of a vehicle by a pin 2. The front end of the spring is also connected to the vehicle frame by a shackle 3 and a fixed spring carrier or arm, whilst its other end terminates in a slot 4. In the latter a block or shoe 5 slides, through which shoe a pin passes supported by a shackle 6 forming the other carrier of the spring. The position of the said shackle can be modified at will for the purpose of adjusting the flexibility of the said spring. To this end, the shackle 6 is secured to a nut through which passes a screwthreaded spindle 7 mounted in a bracket 8 secured to the casing 9 of the wheel axle. The screwthreaded spindle 7 terminates in a square part to which a crank handle 10 can be fitted.

By turning the screw spindle 7 in either direction by the handle 10, the shackle 6 will be moved, together with the slide block 5 in the slot 4. Thus it is possible to shorten or lengthen the overhang leverage of the spring and consequently to reduce or to increase its flexibility.

Figure 2:
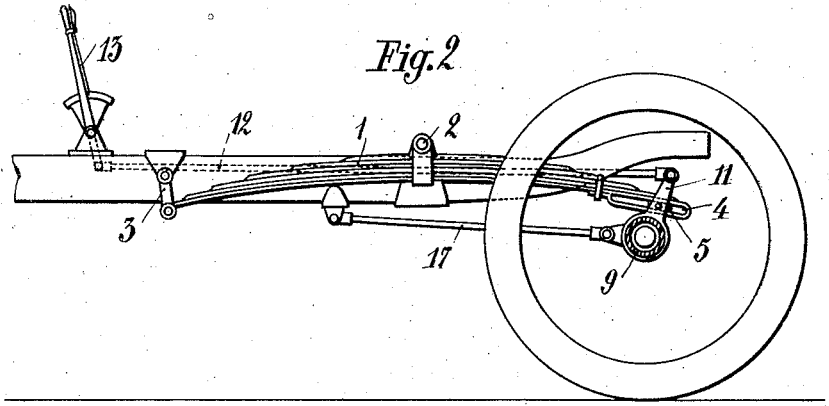
Figure 2 is similar view of similar mechanism, but showing the adjusting means arranged forward of the rear axle and within reach of the operator of the vehicle.

In the arrangement shown in Figure 2, the cantilever spring is arranged as in Figure 1, but with the difference that the pin passing through the slide block 5 is supported by an arm 11 pivoted about the casing 9 and connected by a rod 12 to an operating lever 13 arranged within reach of the driver. A strut 17 connects the casing 9 to the frame of the vehicle. By acting on the lever 13 in the desired direction, the driver can, while traveling swing the arm 11, thereby moving the slide block 5 in the slot 4 of the spring, and consequently modifying the flexibility of the latter by varying the length of its overhanging arm.

Figure 3:
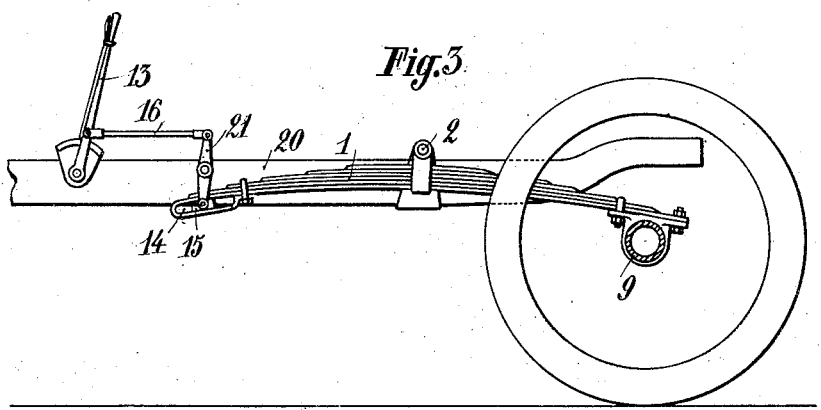

In the arrangement shown in Figure 3, the cantilever spring 1, is also pivoted by its central pin 2 to the frame 20, and its overhanging rear end is connected by a strap to the casing 9 of the wheel axle, whilst its front end has a slot 14 in which a slide block 15 can travel, through which passes a pin supported by an arm 21 pivoted to the frame 20. This pivoted arm 21 is connected by a rod 16 to the operating lever 13 which is provided with a locking quadrant, arranged within reach of the driver. By this arrangement, variation of flexibility of the spring 1 is obtained not by varying the length of the overhanging part, as in the constructions shown in Figures 1 and 2, but by varying the length of the part which is not overhanging.

The construction shown in Figure 4, is a combination of the two constructions shown in Figures 2 and 3. The spring 1 rests with its overhanging part on a sliding carrier constituted by the slide block 5 supported by the swinging arm 11, whilst the non-overhanging part rests also on a sliding carrier constituted by a slide block 15 carried by a pivoted arm 21. The swinging arm 11 and the pivoted arm 21 are connected respectively by rods 12 and 16 to the operating lever 13. By operating the said lever 13, the driver can simultaneously move the two carriers of the spring so as to bring them nearer together or farther apart, so that variation of the flexibilty of the spring 1 is obtained at the same time by increasing or shortening the length of its overhanging part and by modifying the length of the non-overhanging part.

Figure 5 shows the same combination as that shown in Figure 4, applied to an axle to which power is transmitted by a Cardan shaft, but with a different construction of the device for controlling the movement of the two sliding carriers 5 and 15. In this construction, the rear carrier is constituted by two slide blocks 5, 17 arranged on the same pin, one of which, 5, can move in the slot 4 of the cantilever spring 1, whilst the other one 17 is mounted in a slot 18 formed on the casing 9 of the wheel axle. The front carrier is also constituted by two slide blocks 14, 22 arranged on the same pin and mounted respectively, one, 15, in a slot 14 of the spring 1, the other 22 in another slot 23 provided in a bracket 24 secured to the frame 20 of the vehicle. The pin of the rear slide blocks 5, 17, and that of the front slide blocks 15, 22, are connected respectively by rods 12 and 25 to the pivoted arm 21 which in its turn is connected by a rod 16 to the operating lever 13. By moving the lever 13, the driver acts at the same time on the two pairs of slide blocks, so as to move them simultaneously towards, or away from, each other, and consequently to bring about a variation of the flexibility of the two parts of the spring.

Figure 6 is a cross-section on line 6—6 of Figure 5, showing the method of mounting the slide blocks acting on the front end of the spring.

Figure 7 is a side elevation of the rear end of the said spring.

In the construction shown in Figure 8, the spring 1, pivoted by its central part 2 to the frame, is connected at its front end to the said frame by the shackle 3, whilst its overhanging rear part has a slot 4 in which can move the slide block 5 constituting the adjustable rear carrier of the spring. A pin passing through the said slide block 5, is supported by a shackle 26 secured to the rear casing 9. The latter is connected, at each of its ends by a bar 27 to a nut 28 on a screw threaded spindle 29 which is mounted so that it can turn in brackets 30 secured at each side of the frame 20. The screw spindles 29 can be simultaneously turned by means of a bevel pinion gearing driven by a spindle 31 arranged transversely of the frame and connected in its turn, by a chain- or other gear, to the operating lever 13. The latter is connected with a ratchet and double pawl, so that the spindle 31 can be driven in one or in the other direction. The arrangement of the bevel pinions operatively connecting the spindle 31 to the screws 29, or the direction of the screw-thread of the said screws, is such that the movement of the nuts 28 is similar at each side of the frame. When the driver, after having turned the double pawl in the desired direction, rocks the lever 13, he brings about simultaneous rotation of the two screws 29, and therefore a movement, in the same direction, of the two nuts 28 which, in their turn, drive through the bars 27, the two ends of the casing 9. The latter is thus moved forwardly or rearwardly, and at the same time the two rear slide blocks are moved in a similar direction in the corresponding slots 4 of the cantilever springs 1.

In the arrangement shown in Figure 8, the modification of the flexibility of the spring is obtained by moving the casing of the rear axles forwards or backwards relatively to the frame of the vehicle. This movement is rendered possible by employing a Cardan driving shaft having telescopic parts. It would also be possible to control the gear by a detachable handle arranged at the side of the frame to drive the shaft 31.

The arrangements hereinbefore described are given merely by way of example, the shapes, dimensions, details of construction and application can be varied without departing from the invention.

Having now particularly described and ascertained the nature of my said invention and in what manner the same is to be performed, I declare that what I claim is:—

1. The combination with a vehicle frame of a cantilever spring having its central portion connected to said frame, one end of said spring being connected to the frame and the other end being connected to one of the vehicle axles, the rear end of said spring being slotted, and a bearing member adjustably mounted on the axle and slidably engaging said slot for increasing or decreasing the effective length of said spring.

2. The combination with a vehicle frame member and an axle member, of a cantilever spring having its central portion pivotally connected to said frame member and provided at one of its ends with an elongated slot, one of said members being provided with a sliding block which is arranged within said slot, and means for shifting said block in said slot for increasing or decreasing the effective length of said spring.

3. The combination with a vehicle frame member and an axle member, of a cantilever spring having its central portion secured to said frame member and provided at one of its ends with an elongated slot, the other end of said spring being fixed to one of said members, and a sliding block carried by one of said members and movably mounted in said slot, and means for shifting said block in said slot for increasing or decreasing the effective length of the spring.

4. A combination as defined in claim 3 in which the block shifting means includes a longitudinally movable rod, and a lever connected to the forward end of said rod for actuating the same.

5. The combination with a vehicle side member and an axle, of a cantilever spring having its central portion secured to the vehicle side member and provided at its ends with elongated slots, a sliding block mounted in each of said slots, a member mounted on the axle and connected to the block which slides in the slot at the rear end of the spring for causing movement of said last named block in its slot, a third member mounted on the vehicle frame and secured to the block which engages the slot at the forward end of the spring, and means for simultaneously moving the last two members for shifting said blocks in the slots to increase or decrease the effective length of the spring.

6. A combination as defined in claim 5 in which the block shifting means includes connecting links and levers, and a hand operating lever for shifting said links and levers.

7. The combination with a vehicle frame member and an axle, of a cantilever spring having its central portion secured to said frame member and its end portions provided with elongated slots, fixed slotted members secured to the axle and to the frame member a pair of blocks sliding in the slotted member of the axle and the slot at the rear end of the spring, a second pair of slotted members slidably engaging the slotted member of the frame member and of the front end of the spring, and manually operated means for moving said pairs of blocks toward or away from each other to increase or decrease the effective length of said spring.

In testimony whereof I affix my signature in the presence of a witness.

MAURICE HOUDAILLE.

Witness:
CHAS. P. PRESSLY.